United States Patent [19]
Seto et al.

[11] Patent Number: 5,219,587
[45] Date of Patent: Jun. 15, 1993

[54] PARTS EXCHANGING DEVICE FOR BLOW MOLDING APPARATUS

[75] Inventors: Yasuhiro Seto; Hitoshi Nakashima; Toshiyuki Shiraishi, all of Hiroshima, Japan

[73] Assignee: Kurata Corporation, Minami-Myojinmachi, Japan

[21] Appl. No.: 814,577

[22] Filed: Dec. 30, 1991

[30] Foreign Application Priority Data

Oct. 25, 1991 [JP] Japan .................. 3-87798[U]

[51] Int. Cl.⁵ .................. B29C 49/04; B29C 49/42
[52] U.S. Cl. .................... 425/185; 425/186; 425/522; 425/532
[58] Field of Search ......... 425/185, 186, 190, 192 R, 425/522, 532, 539

[56] References Cited

U.S. PATENT DOCUMENTS

| | | | |
|---|---|---|---|
| 3,685,938 | 8/1972 | LaGoutte | 425/185 |
| 4,082,487 | 4/1978 | Rapp | 425/185 X |
| 4,544,340 | 10/1985 | Hehl | 425/185 X |
| 4,758,147 | 7/1988 | Inaba | 425/186 |
| 4,911,631 | 3/1990 | Harada et al. | 425/185 X |
| 5,063,648 | 11/1991 | Yonezawa et al. | 425/190 X |

FOREIGN PATENT DOCUMENTS

| | | |
|---|---|---|
| 0265713 | 5/1988 | European Pat. Off. . |
| 2601619 | 1/1988 | France . |
| 56-143 | 1/1981 | Japan . |
| 1-244810 | 9/1989 | Japan . |

Primary Examiner—Richard L. Chiesa
Attorney, Agent, or Firm—Sixbey, Friedman, Leedom & Ferguson

[57] ABSTRACT

A detaching and attaching device is provided at one end side of a carrier which moves between below the parts fitting position and the parts carrying in and out position and a transferring device is provided at the other end side. Articles are attached to and detached from an object of attachments by moving the carrier toward below the parts fitting position and by the detaching and attaching device. At this time, by working the transferring device, while detached articles are received from the detaching and attaching device, articles to be fitted are delivered to the detaching and attaching device.

3 Claims, 3 Drawing Sheets

PARTS EXCHANGING DEVICE FOR BLOW MOLDING APPARATUS

BACKGROUND OF THE INVENTION

This invention relates to an improvement on the parts exchanging device for blow molding apparatus, particularly to a counter measure to shorten time required for exchanging parts and the construction of a carrier.

Conventionally, in the case where tubular plastic articles, such as plastic containers, are blow molded, parison pushed out of an extrusion head is caught by a mold of a blow molding apparatus and the air is let in the parison by working air blowing means comprising a pre-pinchers, an air nozzle, etc., arranged below the mold.

When exchanging molds, a die and a core attached to an extrusion head (hereinafter referred to as "a die/core attachment"), must also be exchanged and when exchanging the die/core attachment, a carrier is moved between below the die/core attachment fitting position at the extrusion head and the die/core attachment carrying in and out position so as to exchange an old die/core attachment with a new one by detaching an old one and attaching a new one in relation to the extrusion head by a detaching and attaching device mounted on the carrier.

In the above conventional method, however, whenever a new and old die/core attachments are exchanged, the carrier must run twice between below the die/core attachment fitting position at the extrusion head and the die/core attachment carrying in and out position and also transferring of die/core attachments must be made by the operation of a crane. Thus, it has been a problem that many hours are required for exchanging of die/core attachments.

On the other hand, in the field of the conventional blow molding apparatus automation has been planned and the precision of apparatus itself has been taken into consideration in construction. Therefore, in order to avoid existence of any impedance which can impede movement of the carrier between the die/core attachment fitting position and the die/core attachment carrying in and out position when the die/core attachments are exchanged, for example, various contrivances have been made, for instance, detouring an impedance which can impede movement of the carrier below rails of the carrier and improving the construction of blow molding apparatus itself.

However, there is a limit in avoiding existence of impedances which can impede movement of the carrier on its moving locus and moreover it is troublesome to do so. Thus, it has been required to avoid effectively impedances which can impede movements of the carrier.

SUMMARY OF THE INVENTION

The present invention has been made in view of the above problematical points and has for its object to shorten time required for exchanging parts by the following method, namely, a parts transferring device is provided on the carrier correlatively to a detaching and attaching device and when exchanging parts such as the die/core attachments, replacement of new and old parts are carried out while the carrier is positioned below the parts fitting position and thus the moving time of the carrier is shortened. Further objects of the present invention are to avoid effectively impedance which can impede movement of the carrier by making improvements on the construction of the carrier itself and to improve the plane precision of the top surface of the carrier by taking into consideration the load on the top surface of the carrier in making improvements on the carrier itself.

In order to attain the above objects, the first solving means of the present invention is to provide a carrier which moves between below the parts fitting position and the parts carrying in and out position; to provide detaching and attaching means to attach and detach the parts to and from an object of attachments; to provide transferring means at the other end side of the carrier; and by working of the transferring means, while the detached parts are received from the detaching and attaching device, parts to be attached are delivered to the detaching and attaching means.

The second solving means of the present invention is that in the above case, a notch part which is notched inwardly from the end surface of the parts fitting position side is formed at the parts fitting position side of the carrier in such a fashion that it has opposed surfaces oppositely to each other up and down so as to avoid interference with any impedance when the carrier moves below the parts fitting position and also support means which supports the upper opposed surface in relation to the lower opposed surface is provided in the notch part in such a fashion that interference with the impedance is avoided.

BRIEF DESCRIPTION OF THE DRAWING

The nature and advantage of the present invention will be understood more clearly from the following description made with reference to the accompanying drawings, in which.

DESCRIPTION OF A PREFERRED EMBODIMENT

An embodiment of the present invention is described below on the basis of the drawings.

Figure 1:
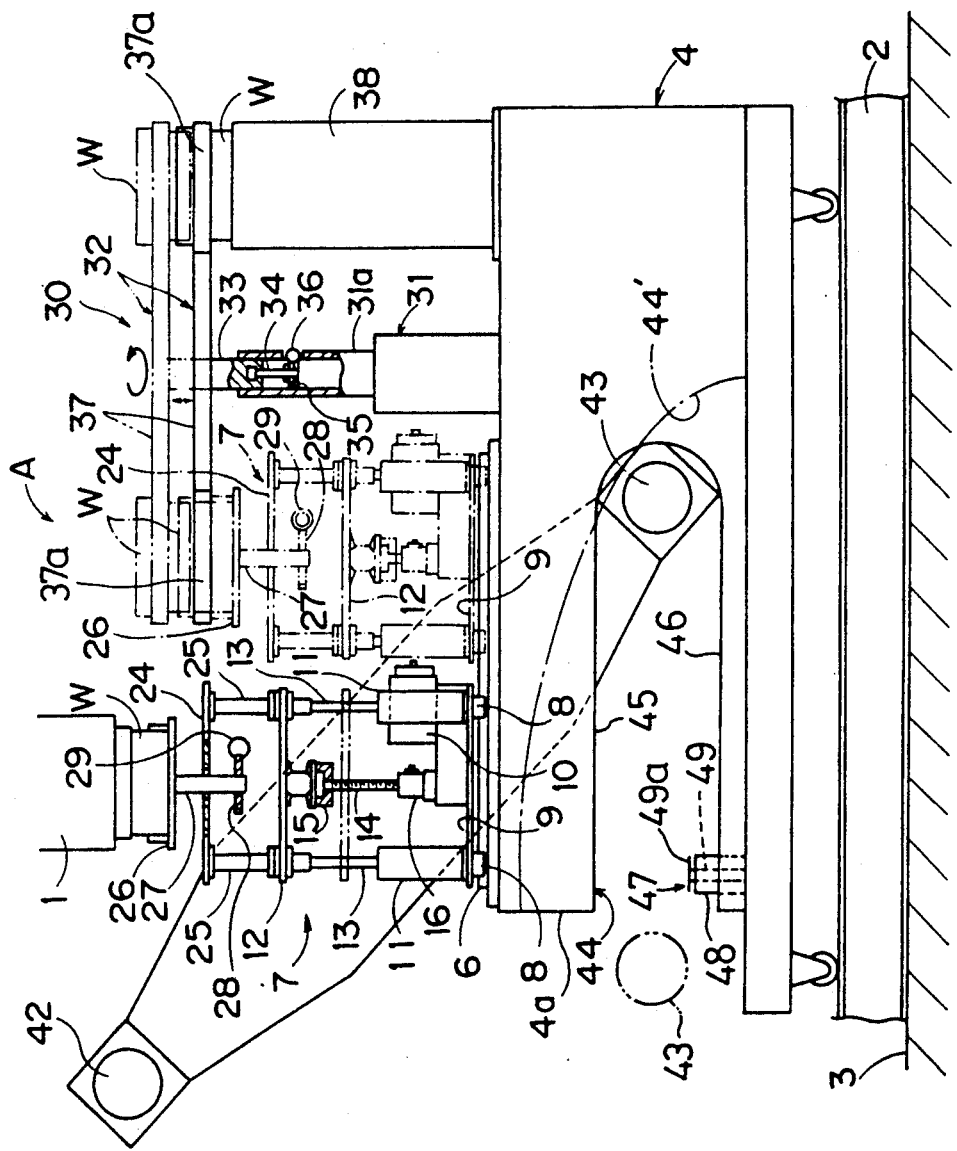
FIG. 1 is a side view of a parts exchanging device.

FIG. 1 shows a parts exchanging device A for blow molding apparatus as an embodiment of the present invention. In this embodiment, it is shown that a die/core attachment W (as parts) is attached to and detached from an extrusion head 1 (as an object of attachments of an extruder arranged above a frame body X) (refer to FIG. 2).

In FIG. 1, reference numeral 2 designates two first guide rails (only one is shown in FIG. 1) laid on a floor 3. A carrier 4 is placed movably on these two first guide rails 2. It is so designated that this carrier 4 moves along the two guide rails 2 by running of a motor (not shown in the drawing) between below the extrusion head 1 and the die/core attachment carrying in and out position (underside of FIG. 3).

Two second guide rails 6 are laid in the same direction as the first guide rails 2 at one end side (left end in FIG. 1) of the top of the carrier 4. Placed movably on these two second guide rails 6 is an attaching and detaching device 7 as a means of attaching and detaching the die/core attachment W to and from the extrusion head 1.

The attaching and detaching device 7 is provided with a first plate 9 which moves on the second guide rails 6 through the medium of slide shafts 8. This first plate 9 is caused to move by running of a first motor 10 on the carrier 4 along the second guide rails 6. Guide tubular members 11 extending upward are provided at four corners of the first plate 9. A second plate 12 is supported movably in vertical direction by guide tubular members 11 through the medium of guide rods 13 inserted therein. Arranged at the center of the first plate 9 is a screw shaft 14 extending upward. While a top end of the screw shaft 14 is inserted rotatably in a boss-shaped support part 15 at the bottom of the second plate 12, a lower end thereof is connected to the axis of rotation of a second motor 16 through the medium of a gear (both are not shown in the drawing). The second plate 12 is moved in vertical direction by running of the second motor 16 as it is guided by each guide rod 13.

A third plate 24 is disposed above the second plate 12 as it is supported by four support rods 25. Supported rotatably at the center of the third plate 24 through which a shaft 27 extending downward is put is a cradle 26 which supports the die/core attachment W. A worm wheel 28 is connected integrally to a lower end of the shaft 27. A worm 29 connected integrally to the axis of rotation of a third motor (not shown in the drawing) engages with the worm wheel 28. The cradle 26 is rotated by running of the third motor at the specified degree of angle (30°, for example) with the shaft 27 as the center of rotation, whereby the die/core attachment W is attached to and detached from the extrusion head 1.

A transferring device 30 as transferring means is mounted on the other end side of the top of the carrier 4 (right end in FIG. 1). This transferring device 30 is provided with an up-and-down cylinder 31 which is on the top of the carrier 4 and has a piston rod 31a extending upward. Connected rotatably to a top end of the piston rod 31a of the cylinder 31 is a lower end of a perpendicular member 33 of a substantially T-shaped support frame body 32. By expansion and contraction working of the cylinder 31, the support frame body 32 is caused to rise and fall in vertical direction. A shaft 34 is connected integrally to a lower end of the perpendicular member 33 of the support frame body 32 and a worm wheel 35 is connected integrally to a lower end of the shaft 34. A worm 36 connected integrally to the axis of rotation of a fourth motor (not shown in the drawing) engages with the worm wheel 35. Substantially U-shaped support parts 37a are formed at both ends of a horizontal member 37 of the support frame body 32. These two support parts 37a support new and old die/core attachments W. Therefore, the horizontal member 37 turns reversely in the horizontal plane by 180° turning action of the perpendicular member 33 by running of the fourth motor. By this reverse turning action, while a detached die/core attachment W is received from the attaching and detaching device 7, a die/core attachment W to be attached is delivered to the attaching and detaching device 7. In FIG. 1 reference numeral 38 designates a preliminarily heating table for preliminarily heating a die/core attachment W which is to be attached.

Figure 2:
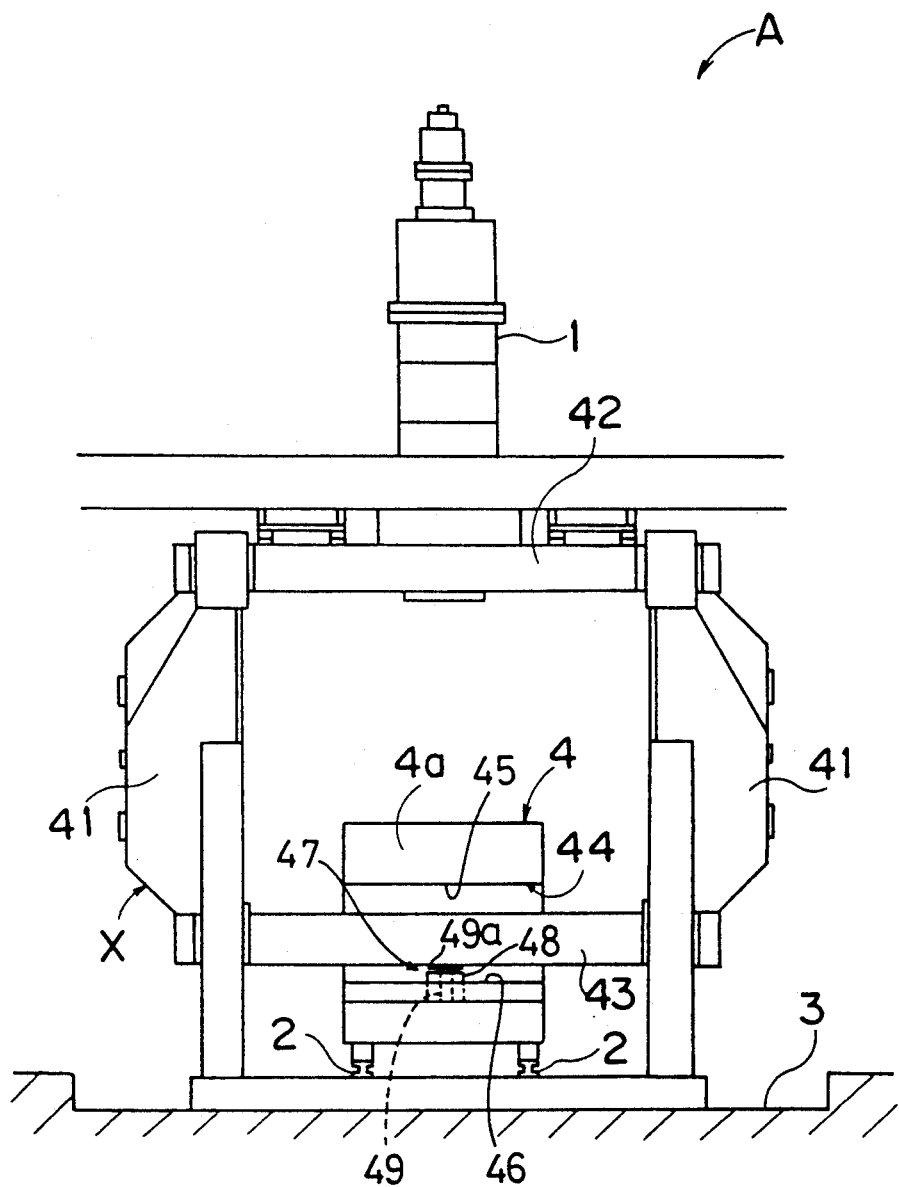
FIG. 2 is a front view of a blow molding apparatus, as seen from the side of parts carrying in and out position.
Figure 3:
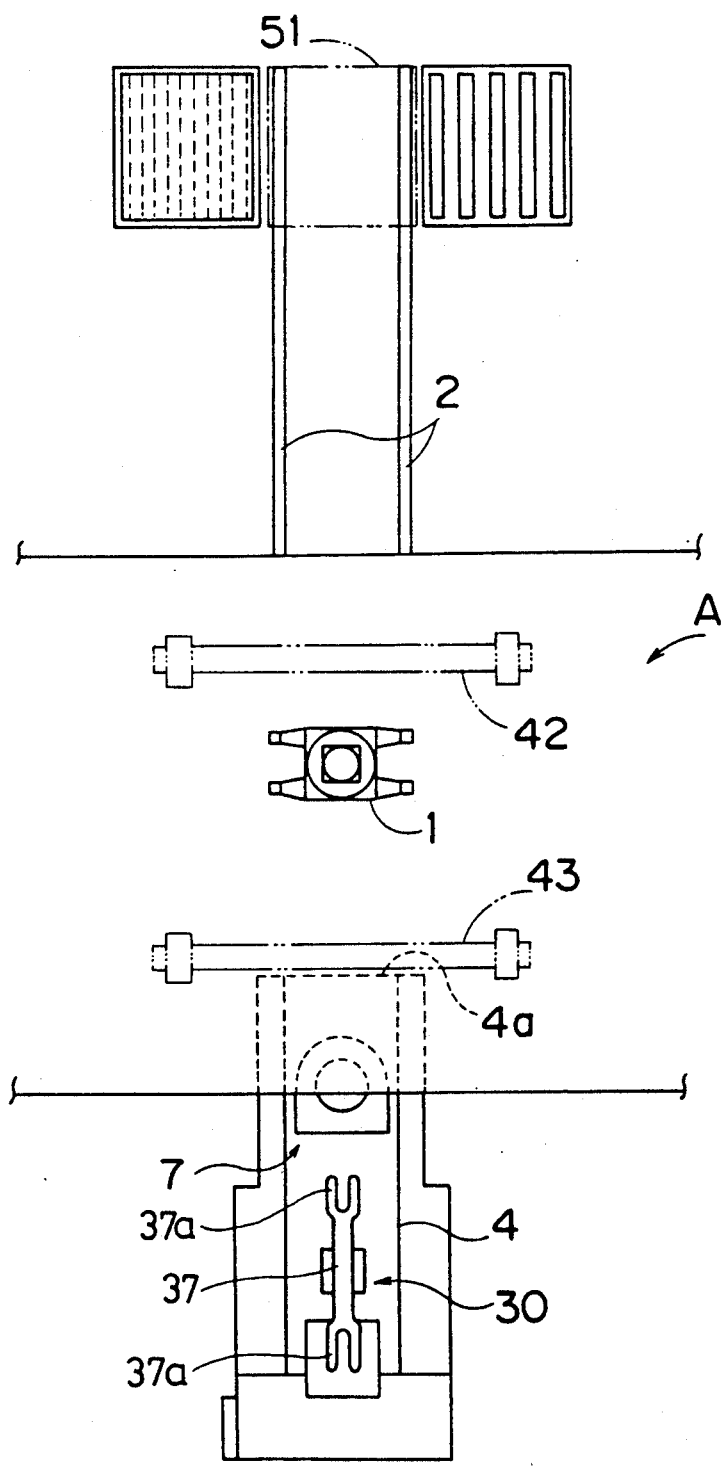
FIG. 3 is a plan view, showing a blow molding apparatus as a whole.

As shown in FIG. 2, a pair of platens (not shown in the drawing) are provided oppositely to each other at vertical frame members 41 of a frame body X framed on the floor 3. These platens in pairs are connected to a top end of the piston rod of fluid pressure cylinders (not shown in the drawing) arranged horizontally with the specified distance left therebetween in vertical direction. These fluid pressure cylinders approach each other by synchronous expansion operation of each cylinder and move away from each other by synchronous contraction operation of each cylinder. A mold (not shown in the drawing) is fixed detachably to the platens in pairs for mold clamping and mold opening by expansion and contraction operations of the fluid pressure cylinders. The vertical frame members 41 of the frame body X are connected slidably to each other by tie bars 42 arranged at the upper and lower sides so that the degree of parallel between platens in pairs at the synchronous expansion and contraction operations of each fluid pressure cylinder (namely, at mold clamping and mold opening) is maintained effectively. As shown in FIG. 2 and FIG. 3, the tie bar 43 at the lower side is arranged below the extrusion head 1 and closer to the die/core attachment taking in and out position (the underside in FIG. 3) than to the extrusion head 1 as an impedance which can impede movement of the carrier 4 along the first guide rails 2.

A notch part 44 which is substantially U-shaped in cross section and is notched inwardly from the end surface of the die/core attachment fitting position side (vertical surface 4a) is formed at a vertical surface 4a of the parts fitting position side of the carrier 4 (left side of FIG. 1) in such a fashion that it has opposed surface 45, 46 opposite to each other up and down so as to avoid interference with the tie bars 43 when the carrier 4 moves toward below the die/core attachment fitting position (extrusion head 1). Under this arrangement according to the movement of the carrier 4 from the die/core attachment carrying in and out position toward below the extrusion head 1 the tie bar 43 is let to enter into the notch part 44 so as to avoid interference with the tie bar 43. In this case, the tie bar 42 at upper side is disposed at such a position that interference with the carrier 4 can be avoided even when the carrier 4 moves below the extrusion head 1 and therefore the tie bar 42 cannot be an impedance to impede movement of the carrier 4.

An expansion and contraction cylinder 47 as a means of supporting the upper opposed surface 45 in relation to the lower opposed surface 46 is provided on the lower opposed surface 46 close to an opening edge of the notch part 44 in such a fashion that interference with the tie bar 43 is avoided. The expansion and contraction cylinder 47 comprises a cylinder tube 48 extending in vertical direction and a cylinder rod 49 inserted telescopically in vertical direction into the cylinder tube 48. Fitted to a top end (upper end) of the cylinder rod 49 is a support plate 49a which supports the upper opposed surface 45 by contacting with the upper opposed surface 45 inside the notch part 44 at the time of expansion of the cylinder rod 49. This support plate 49a lowers to the upper surface of the cylinder tube 48 at the time of contraction of the cylinder rod 49 so that interference with the tie bar 43 entering into the notch part 44 according to the movement of the carrier 4 from the die/core carrying in and out position to below the extrusion head 1 can be avoided.

In short, when the tie bar 43 enters into the notch part 44 at the movement of the carrier 4 from the die/core attachment carrying in and out position toward below the extrusion head 1 and also when the tie bar 43 gets out of the notch part 44 at the movement of the carrier 4 from below the extrusion head 1 toward the die/core attachment carrying in and out position (namely, when the tie bar 43 in the notch part 44 passes through above the expansion and contraction cylinder 47 according to the movement of the carrier 4 between the die/core attachment carrying in and out position and below the extrusion head 1), interference with the tie bar 43 can be avoided by causing the cylinder rod 49 to contract. Also, after the tie bar 43 in the notch part 44 passed through above the expansion and contraction cylinder 47 according to the movement of the carrier 4 between the die/core attachment carrying in and out position and below the extrusion head 1, the upper opposed surface 45 in the notch part 44 is supported by the support plate 49a in relation to the lower opposed surface 46 by causing the cylinder rod 49 to expand. In this case, the cylinder rod 49 is of double construction with an inner tube supported slidably in relation to an outer tube. Although the distance between the top of the cylinder tube 48 and the upper opposed surface 45 in the notch part 44 is longer than the height of the cylinder tube 48, it is so designed that the support plate 49a can touch easily the upper opposed surface 45 in the notch part 44.

In FIG. 3, reference numeral 51 designates a carrier for exchanging molds provided on the track of two first guide rails 2.

An explanation is made below about the main point of exchanging new and old die/core attachments W in relation to the extrusion head 1 by using a parts exchanging device A composed as mentioned above. It is premised that a die/core attachment W to be fitted is preliminarily heated at the preliminarily heating table 38 and is supported by one of the support parts 37a of the support frame body 32 of the transferring device 30 and also the attaching and detaching device 7 moves in the direction of going away from the transferring device 30 along the two second guide rails 6 and is positioned at the top end side of the carrier 4.

When production ended and a mold was removed, the carrier 4 is moved from the die/core attachment carrying in and out position toward below the extrusion head 1 along the two first guide rails 2 and the attaching and detaching device 7 is positioned right below extrusion head 1.

Then, the second plate 12 is raised by running of the second motor 16 and the die/core attachment W attached to the extrusion head 1 is supported by the cradle 26. In this state, the cradle 26 is rotated by the specified degree of angle with the shaft 27 as center of rotation and the die/core attachment W is detached from the extrusion head 1.

Thereafter, after the second plate 12 was lowered by running of the second motor 16, the attaching and detaching device 7 as a whole is caused to approach the side of the transferring device 30 by running of the first motor 10 and the die/core attachment W is delivered to the other support part 37a of the support frame body 32 of the transferring device 30.

Then, after the delivered die/core attachment W was raised by expanding operation of the up-and-down cylinder 31, it is turned reversely by 180° by running of the fourth motor, whereby the die/core attachment W delivered from the side of the attaching and detaching device 7 is moved to the side of the preliminarily heating table 38 and the die/core attachment W heated at the preliminarily heating table 38 is moved to the side of the attaching and detaching device 7.

Further, both die/core attachments W are lowered by contracting operation of the up-and-down cylinder 31 and a die/core attachment W is received from the side of the transferring device 30.

Thereafter, the attaching and detaching device 7 as a whole is moved in the direction of going away from the side of the transferring device 30 by running of the first motor 10 and is positioned at the forward end side of the carrier 4.

Thereafter, the die/core attachment W is disposed at the position corresponding to the extrusion head 1 by raising the second plate 12 by running of the second motor 16. In this state, the cradle 26 is rotated by the specified degree of angle with the shaft 27 as center of rotation by running of the third motor and the die/core attachment W is fitted to the extrusion head 1.

Then after the second plate 12 was lowered by running of the second motor 16, the carrier 4 is moved to the die/core attachment carrying in and out position, the detached die/core attachment W is carried out and a die/core attachment W intended for the next production is placed on the preliminarily heating table 38.

As stated above, in this embodiment the carrier 4 is moved from the die/core attachment carrying in and out position toward below the extrusion head 1, the die/core attachment W is detached from the extrusion head 1 by operation of the attaching and detaching device 7 mounted on the carrier 4, the detached die/core attachment W is received from the attaching and detaching device 7 and a die/core attachment W to be attached is delivered to the attaching device 7.

Under the above arrangement, when new and old die/core attachments are exchanged the carrier 4 is required to go and return only once and new and old die/core attachments W can be exchanged while the carrier 4 is positioned below the die/core attachment fitting position. Thus, moving time of the carrier is shortened and accordingly time required for exchanging die/core attachments can be shortened.

In the above embodiment, the notch part 44 is formed in the carrier 4 and when the carrier 4 moves toward below the extrusion head 1, the lower tie bar 43 is let in the notch part 44 so as to avoid interference with the carrier 4. Therefore, it is not necessary to make troublesome contrivances, such as detouring the lower tie bar 43 as an impedance which can impede movement of the carrier 4 below the rails of the carrier 4 and improving the construction of a blow molding apparatus itself.

In the above embodiment, when the tie bar 43 passes through the notch part 44 of the carrier 4, interference with the tie bar 43 is avoided by causing the expansion and contraction cylinder 47 to do contracting operation and after the tie bar 43 passes through, the upper opposed surface 45 in the notch part 44 is supported by the support plate 49a in relation to the lower opposed surface 46 by causing the cylinder 47 to do expanding operation. By providing the notch part 44, the upper opposed surface 45 can be prevented from coming down due to weight of the attaching and detaching device, the transferring device 30, etc. and thus surface precision at the top of the carrier 4 can be improved.

In the above embodiment, new and old die/core attachments W are exchanged by turning reversely the transferring device 30 by 180° but the exchanging method is not limited to this reverse turning, for example, it is possible to place plural kinds of die/core attachments on a turn table and exchange new and old die/core attachments W by turning the table bit by bit. It is also possible to exchange new and old die/core attachments W by moving them by the conveyor system.

In the above embodiment, the expansion and contraction cylinder 47 is arranged on the lower opposed surface 46 close to an opening edge part of the notch part 44, but the expansion and contraction cylinder can be arranged on the upper opposed surface 45. In this case, the expansion and contraction cylinder 47 is so composed that it is capable of rising and lying down by a hinge so that when the expansion and contraction cylinder 47 passes through the tie bar 43, it lies down but after it passed through the tie bar 43, it hangs down (rises) in downward direction. It is also possible to arrange plural expansion and contraction cylinders 47, with the specified space left therebetween, toward the innermost part of the notch part 44 and to cause said expansion and contraction cylinders 47 to expand and contract successively according to the movement of the carrier 4. In this case, the surface precision at the top of the carrier 4 can be improved effectively.

Furthermore, in the above embodiment it is shown that the tie bar 43 is an impedance which can impede movement of the carrier 4 but such impedance may be a harness or the like and in such cases, too, interference with a harness or the like can be avoided effectively. It goes without saying that parts can be other than die/core attachments W.

In the above embodiment, the notch part 44 is substantially U-shaped in cross section but can be a notch part 44' of circular arc shape as shown by an one-dot chain line in FIG. 1.

What is claimed is:

1. A parts exchanging device for a blow molding apparatus comprising:

a carrier which moves between below a parts fitting position and a parts carrying in and out position;
    detaching and attaching means which is provided at one end side of said carrier and which attaches and detaches parts to and from an object of attachment while said carrier is positioned below the parts fitting position; and
    transferring means which is provided at the other end side of said carrier and which receives the detached parts from said detaching and attaching means and delivers parts to be fitted to said detaching and attaching means;
    wherein said detaching and attaching means comprises a first plate which is movable to and away from said transferring means, a second plate which is provided above said first plate, a third plate provided above said second plate and a cradle which is provided on said third plate and is capable of rotating by a specified degree of angle in a horizontal plane and by the forward and reverse turning of the cradle articles are attached to and detached from said object of attachment.

2. A parts exchanging device for a blow molding apparatus as defined in claim 1, wherein said transferring means comprises a support frame body having a horizontal member with a support part which supports articles at both ends thereof, an up-and-down means to raise and lower said support frame body and a reverse turning means to turn reversely said support frame body in the horizontal plane.

3. A parts exchanging device for a blow molding apparatus as defined in claim 1, further comprising a notch part formed in said carrier for avoiding interference with an impedance at the movement of said carrier toward below the parts fitting position, said notch part being formed inwardly from the end surface of the parts fitting position at the parts fitting position side of the carrier in such a fashion that the notch part has opposed surfaces opposite to each other up and below and support means which supports an upper opposed surface in relation to a lower opposed surface is provided in the notch part in such a fashion that interference with said impedance is avoided.

* * * * *